(12) United States Patent
Nguyen

(10) Patent No.: US 6,792,128 B1
(45) Date of Patent: Sep. 14, 2004

(54) METHOD OF INSERTING AND EXTRACTING A DIGITAL SIGNATURE

(75) Inventor: Eric Nguyen, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/498,358

(22) Filed: Feb. 4, 2000

(30) Foreign Application Priority Data

| Feb. 16, 1999 | (FR) | 99 01852 |
| Feb. 16, 1999 | (FR) | 99 01853 |

(51) Int. Cl.$^7$ ............................................. G06K 9/00
(52) U.S. Cl. ..................... 382/100; 382/190; 382/289
(58) Field of Search ............................... 382/100, 190, 382/199, 239

(56) References Cited

U.S. PATENT DOCUMENTS

| 5,636,292 A | * | 6/1997 | Rhoads ........................ 382/232 |
| 5,949,055 A | * | 9/1999 | Fleet et al. .................. 235/469 |
| 6,154,571 A | * | 11/2000 | Cox et al. .................... 382/250 |
| 6,373,960 B1 | * | 4/2002 | Conover et al. ............ 382/100 |

FOREIGN PATENT DOCUMENTS

| EP | 0 766 468 | 4/1997 |
| WO | WO 97/43736 | 11/1997 |

OTHER PUBLICATIONS

A Secure Robust Digital Image Watermark by Joseph Ruanaidh et al., Proc. SPIE vol. 3409: Electronic Imaging: Processing, Printing and Publishing in Color, Sep. 1998.*
"Multimedia Data–Embedding and Watermarking Technologies", M.D. Swanson, et al., Proc. IEEE, vol. 86, No. 6, Jun. 1998.
"Secure Spread Spectrum Watermarking for Multimedia", I.J. Cox, et al., IEEE Trans. Image Processing, vol. 6, No. 12, Dec. 1997.
"Rotation, Scale and Translation Invariant Spread Spectrum Digital Image Watermarking", J. Ruanaidh, et al., Signal Processing 66, pp. 301–317, 1998.
"A Combined Corner and Edge Detector", C. Harris, et al., Proc. of the 4$^{th}$ Alvey Vision Conference, 1988.
"Comparing and Evaluating Interest Points", C. Schmid, et al., International Conference on Computer Vision, pp.1–23, Jan. 1998.
"Transparent Robust Image Watermaking", M. Swanson, et al., Proc. ICIP'96, vol. III, pp. 211–214, 1996.

(List continued on next page.)

*Primary Examiner*—Amelia M. Au
*Assistant Examiner*—Charles Kim
(74) *Attorney, Agent, or Firm*—Fitzpatrick, Cella, Harper & Scinto

(57) ABSTRACT

A method of inserting additional information, such as a digital signature, in a digital image comprises the following steps:

detecting (E10) the points of interest in said image (I);

selecting (E11) a subset of points of interest adapted to define a geometric reference frame in said image (I);

calculating (E12), for the geometric reference frame, reference information necessary for determining the geometric transformation applied to the image for a class of predetermined geometric transformations;

coding (E13) said reference information in a reference key (Kr); and inserting (E16–E19) the additional information in said digital image (I).

Use notably for geometrically re-fixing the image before extracting the signature.

63 Claims, 8 Drawing Sheets

OTHER PUBLICATIONS

"Adaptive Watermarking in the DCT Domain", B. Tao, et al., Proc. ICASSP'97, pp. 2985–2988, 1997.

Outils Geometriques pour la Modelisation et la Reconnaissance D'Objects Polyedriques, C. Puech, et al., PhD Thesis, INPG, pp 133–137, Jul. 1993.

"Digital Watermarking by Geometric Warping", Maes, et al. Proceedings of ICIP98 International Conference of Image Processing, vol. 2, Oct. 4–7, 1998, pp. 424–426, XP002116542, New York, NY.

* cited by examiner

Point of interest

Partitioning into blocks

Chosen block

✚ Point of interest

Partitioning into blocks

Chosen block (i,j) : coordinates of the block

METHOD OF INSERTING AND EXTRACTING A DIGITAL SIGNATURE

BACKGROUND OF THE INVENTION

1. Field of the Invention

The present invention concerns methods of inserting additional information, such as a digital signature, in a digital image.

It also concerns methods of extracting this additional information.

Correlatively, the present invention concerns a device for inserting and a device for extracting additional information adapted to implement respectively the insertion methods and the extraction methods according to the invention.

2. Description of the Related Art

The present invention applies more generally to the field of watermarking digital data, and more particularly digital images.

In general terms, the watermarking of digital data can be interpreted as the insertion of a seal or signature, for example for authenticating the author or origin of a digital document.

Conventionally, such a signature must be inserted imperceptibly, that is to say in a fashion which is not detectable to the eye in the case of an image.

It must also be robust to the normal operations of digital signal processing, such as compression, for example, for fixed images, in accordance with the JPEG (Joint Photographic Expert Group) standard, filtering, digital to analogue conversion (for printing an image for example), analogue to digital conversion (for digitising a printed image for example) and geometric manipulations of the image, such as plane similarities integrating translations, rotations, changes of scale or even divisions.

The signature must also be robust to intentional attacks aimed at extracting or erasing it so as, for example, to arrogate the copyright over an image.

The majority of techniques for inserting additional information in digital data consist of choosing a set of so-called perceptually significant spatial or frequency components of the digital signal, in which the additional information can be inserted in a robust fashion notably vis-á-vis the normal compression methods, signal processing operations, intentional attacks and also, to a certain extent, geometric transformations.

Such a technique is described for example in the European patent application EP 0 766 468 filed in the name of NEC CORPORATION.

These digital image watermarking techniques are based on a prior frequency transformation of the digital image, for example by means of a discrete cosine transformation by blocks, a choice of significant components amongst the components obtained by transformation, a modulation of the components chosen for inserting the signature and an inverse frequency transformation in order to obtain the watermarked image.

When the signature is extracted, the extraction method also uses a frequency transformation of the image to be authenticated, a choice of the significant components and a demodulation of these components in order to find the inserted signature.

There also exist techniques in which the coefficients are modified according to a predetermined rule, known to the decoder. The decoding step then consists of examining whether this predetermined rule is indeed verified or not. Such a technique is described for example in the document entitled "Video-steganography: how to secretly embed a signature in a picture" by Matsui Kineo and Tamaka Kyoshi, IMA Intellectual Property Project Proceedings, Volume 1, issue 1, January 1994.

Nevertheless, when the image has undergone geometric transformations such as plane similarities, the parameters of these geometric transformations must be known a priori or estimated in a relatively precise fashion when the signature is extracted so as to re-fix the image in space.

Such a re-fixing is generally difficult to effect and requires having the original image at the decoder implementing the signature extraction method.

One means of getting around the difficulty is to use a frequency transformation which is invariant to the usual geometric transformations, such as for example the Fourier-Mellin transformation invariant to rotations and changes in scale, described in the article by J. RUANAIDH et al, "Rotation, scale and translation invariant spread spectrum digital image watermarking", Signal Processing, 6, 1998.

Such a watermarking method is of limited application since it does not make it possible to use the conventional spectral decomposition methods in the domain of the digital images, such as Fourier transforms, discrete cosine transforms, either global or by blocks, or discrete wavelet transforms.

Another technique is described in international patent application WO 97/43736 in which a fixed reference is inserted invisibly in the image at the time of insertion of the signature. This reference is then detected in order to re-fix the image before extraction of the signature.

However, this method requires the insertion of additional information imperceptibly, independently of the signature itself.

In addition, this reference can be detected intentionally with statistical methods and be intentionally erased.

SUMMARY OF THE INVENTION

The aim of the present invention is in a first aspect to propose a method of inserting and extracting a signature in a digital image which makes it possible effectively to know and reverse the geometric transformations applied to a digital image.

To this end, the method of inserting additional information, such as a digital signal, in a digital image, comprises the following steps:

detecting the points of interest in said image;

selecting a subset of points of interest adapted to define a geometric reference frame in said image;

calculating, for the geometric reference frame, reference information necessary for determining the geometric transformation applied to the image for a class of predetermined geometric transformations;

coding said reference information in a reference key; and inserting the additional information in said digital image.

Correlatively, the method of extracting additional information, such as a digital signature, inserted in a digital image, comprises the following steps:

detecting the points of interest in said image;

selecting a subset of points of interest adapted to define a geometric reference frame in said image in accordance with selection criteria identical to those used during the insertion of the additional information in the original digital image;

decoding a reference key in order to extract reference information necessary for determining the geometric transformation applied to the original digital image;

calculating the parameters of the geometric transformation applied to the original image from said subset of points of interest and the reference information extracted;

re-fixing the digital image by applying an inverse geometric transformation determined from the calculated parameters; and extracting said additional information from the re-fixed image.

Thus the image can be effectively re-fixed in space before the inserted signature is extracted, by means of selected points of interest and reference information calculated when the signature is inserted.

The means used for re-fixing the digital image are consequently dependent on the image itself and do not make it necessary to use additional information.

Such a method is robust to intentional attacks which seek to modify or destroy the signature inserted by means of the use of a reference key, possibly encrypted.

By definition, the points of interest are local characteristics of the image which convey significant information on the content of the image. This is a case mainly of the points where the bidimensional variations in the light intensity are great, such as for example corners.

Advantageously, it is shown that these points of interest, detected for example by a detector known as a Harris detector, are relatively invariant to geometric transformations such as rotation, translation, change in scale and also change in point of view, and are consequently particularly well suited to defining a geometric reference frame which can be used for re-fixing the digital image before the signature is extracted.

In addition, such a method is robust to the conventional compression techniques used for coding the digital images. This is because the points of interest are entities which are generally preserved after compression since they represent significant information on the content of the image.

According to a preferred characteristic of the invention, the reference information necessary and sufficient for geometric transformations of plane similarity types comprises four parameters calculated from the geometric reference frame.

In this way, for a class of geometric transformations, the quantity of information which it is necessary to calculate and store in a reference key to be supplied for decoding is minimised.

The four parameters are sufficient for defining an angle, a distance and the coordinates of a point of origin of the geometric reference frame in the digital image or the coordinates of two points of the geometric reference frame in the digital image.

The quantity of information to be decoded for re-fixing the image is also minimised whilst make it possible to calculate, at the calculation step of the extraction method, the parameters of the geometric transformation, which are, for geometric transformations of plane similarity types, an angle of rotation, a homothetic transformation factor and a translational movement in two perpendicular directions of the digital image.

In order to minimise this reference information still further, the latter can in practice be limited to two parameters characterising an angle and a distance, a predetermined point of interest amongst the subset of selected points of interest being chosen as the origin of the reference frame of the modifications during the step of inserting and extracting the additional information.

This is because the techniques of inserting/extracting additional information can be classified according to the signal representation domain, spatial, frequency or spatio-frequency, in which the operations of inserting/extracting the additional information take place. The insertion proper may be effected by modulation of the amplitude of the coefficients of the representation domain considered. This modulation is always defined with respect to a reference frame and it is necessary, during the extraction step, to re-fix this signal to be coded in this reference frame, which can be referred to as the modulation or demodulation reference frame, so as to be able to extract the additional information.

The insertion can also be effected by modifying the coefficients in accordance with a pre-established rule, for example by requantising these coefficients. This modification will also be defined with respect to a modification reference frame and it will also be necessary to re-fix the signal to be decoded in this reference frame so as to extract the additional information inserted.

In the case of an insertion in the spatial domain, ie the pixel domain, it therefore suffices to define the reference frame of the modifications with respect to the geometric reference frame chosen, the most simple being to take the same. In the case of an insertion in the frequency or spatio-frequency domain, the reference frame of the modifications in the transformed domain cannot be directly linked to the geometric reference frame. On the other hand it is the transformation of the signal itself, that is to say the block cosine transform or the discrete wavelet transform, which must be defined with respect to the geometric reference frame chosen, given a reference frame of the modifications which is fixed in the transformed domain. For example, the origin of the transformation of the signal at the origin of the geometric reference frame chosen will be chosen, considering the horizontal and vertical axes as the main axes of the transformation. More generally, the reference frame of the modifications is defined with respect to the phase of the representation of the signal under consideration having as its origin the geometric reference frame chosen.

According to another preferred characteristic of the invention, the insertion method also includes a step of calculating selection information on said subset of points of interest and a step of coding said selection information in a selection key.

Correlatively, the step of selecting the extraction method includes a step of decoding a selection key in order to extract selection information for said subset of points of interest.

This arrangement makes it possible to choose the points of interest by employing certain local or global geometric constraints, storing and then decoding the selection key making it possible to find the subset of points of interest chosen.

The use of a selection key characterising the selection of points of interest further increases the robustness of the method against intentional attacks.

Preferably, the selection information comprises invariant quantities for said class of predetermined geometric transformations, the value of the invariant quantities uniquely characterising a subset of points of interest in said image.

The selection information thus constituted is sufficient for finding, from the geometric invariants, the subset of points defining the geometric reference frame in the image to be re-fixed.

There also, the selection information depends only on the image itself and is therefore difficult to attack intentionally if the selection key is not available.

In practice, the subset of points of interest comprises a triplet of points of interest and the selection information comprises an angle and a distance ratio characterising said triplet of points of interest for geometric transformations of plane similitudes.

Although in absolute terms two points of interest suffice for calculating the reference information sufficient for re-fixing the image, the use of a third point for defining the geometric reference frame makes it possible to obtain a more reliable detection of the combination of points chosen in the image from the unique value of the geometric invariants.

Alternatively, the selection information can comprise criteria of an interactive selection guided by an operator, which can thus, for each image, visually choose, for example amongst the points of interest, those which are best suited to the definition of a geometric reference frame and to a simple calculation of the reference information.

According to one embodiment of the invention, not requiring the storage and decoding of a selection key, the points of interest with the greatest magnitudes at the output of the points of interest detector are selected at the selection step.

According to another characteristic of the invention, which advantageously makes it possible to use the detected points of interest, the step of inserting additional information comprises a step of choosing perceptually significant components to be modified for the insertion of the additional information, said perceptually significant components being chosen in the vicinity of said selected points of interest.

Correlatively, the step of extracting additional information comprises a step of choosing perceptually significant components modified for the insertion of the additional information, said perceptually significant components being chosen in the vicinity of said selected points of interest.

The insertion, and following that the extraction, of the additional information can thus be effected in a localised fashion, in the vicinity of the points of interest. The latter being intrinsically robust to the techniques of digital image compression, the signature is thus inserted robustly in the digital image.

Moreover, the choice of the significant components is effected independently of any spectral transformation of the image, which makes it possible to use a local watermarking method in which the additional information is directly inserted on the spatial components of the pixel domain.

According to one advantageous characteristic of the invention, the insertion step comprises a step of spatio-frequency transformation of the digital image after the step of choosing the perceptually significant components.

Correlatively, the extraction step comprises a step of spatio-frequency transformation of the digital image after the step of choosing the perceptually significant components.

Unlike the conventional techniques for watermarking digital images, the choice of the significant components can be effected before spectral transformation of the image provided that the insertion technique is space-frequency hybrid, that is to say that the additional information is inserted on components defined both in space and in frequency, obtained for example by spatio-frequency transformations like discrete cosine transform by block or discrete wavelet transform type.

In a similar fashion, the invention also concerns in its first aspect a device for inserting additional information, such as a digital signature, in a digital image, characterised in that it has:

means of detecting the points of interest in said image;

means of selecting a subset of points of interest adapted to define a geometric reference frame in said image;

means of calculating, for the geometric reference frame, reference information necessary for determining the geometric transformation applied to the image for a class of predetermined geometric transformations;

means of coding said reference information in a reference key; and means of inserting the additional information in said digital image.

It also concerns a device for extracting additional information, such as a digital signature, inserted in a digital image, characterised in that it has:

means of detecting the points of interest in said image;

means of selecting a subset of points of interest adapted to define a geometric reference frame in said image in accordance with selection criteria identical to those used during the insertion of the additional information in the original digital image;

means of decoding a reference key in order to extract reference information necessary for determining the geometric transformation applied to the original digital image;

means of calculating the parameters of the geometric transformation applied to the original image from said subset of points of interest and the reference information extracted;

means of re-fixing the digital image by applying an inverse geometric transformation determined from the calculated parameters; and means of extracting said additional information in the re-fixed image.

These insertion and extraction devices have characteristics and advantages similar to those described above since they are adapted to implement the methods of inserting and extracting additional information in accordance with the invention.

According to a second aspect of the invention, it appears that the choice of perceptually significant components is a crucial aspects of these techniques of inserting and extracting a digital signal.

An analysis of the prior techniques shows that the most effective watermarking techniques, such as the method described in the document EP 0 766 468 cited above, are based on a choice amongst frequency components or space/frequency hybrid components (that is to say those located both in the image space and in the frequency domain) of significant components of greater amplitude, in the sense of the greatest local energy.

An image processing method is also described in the patent application (09/318,819) wherein a digital image is divided into blocks, and a group of pixels for determining pixels in which information should be embedded and a group of pixels for embedding are selected as pixels different from each other.

The group of pixels for determination surrounds the group of pixels for embedding.

Watermark information is embedded into a block if the density variation of the group of pixels for determination is greater than a predetermined threshold value.

The aim of the present invention in its second aspect is to propose a method of inserting and extracting a signature in a digital image which make it possible to effectively select significant components which can be used for inserting a digital signature robustly in an image and which can be found in a reliable way in the image to be decoded.

To this end, the method of inserting additional information, such as a digital signature, in a digital image, comprises in a second aspect of the invention the following steps:

detecting the points of interest in said image;

selecting a subset of points of interest;

calculating a selection information comprising invariant quantities for a class of predetermined geometric transformations, the value of the invariant quantities uniquely characterising said subset of points of interest in said image;

choosing perceptually significant components to be modified for inserting the additional information in the vicinity of said selected points of interest; and inserting the additional information by modifying said perceptually significant components.

Correlatively, the present invention in its second aspect concerns a method of extracting additional information, such as a digital signature, inserted in a digital image, comprising the following steps:

detecting the points of interest in said image;

selecting a subset of points of interest according to a selection information comprising invariant quantities for a class of predetermined geometric transformations, the value of the invariant quantities uniquely characterising said subset of points of interest in said image;

choosing perceptually significant components modified for inserting the additional information in the vicinity of the said selected points of interest; and extracting the additional information from said modified perceptually significant components.

The insertion, and subsequently the extraction, of the additional information can thus be performed in a localised fashion, in the vicinity of the points of interest. Since the latter are intrinsically robust to digital image compression techniques, the signature is thus inserted robustly in the digital image.

Moreover, the choice of significant components is made independently of any spectral transformation of the image, which makes it possible to use a local marking method in which the additional information is directly inserted on the spatial components of the pixel domain.

The selection information thus constituted is sufficient for finding, from the geometric invariants, the subset of points of interest selected in the image to be decoded.

The selection information depends only on the image itself and is therefore difficult to attack intentionally if the selection key is not available.

According to one advantageous characteristic of the invention, the insertion step comprises a step of spatio-frequency transformation of the digital image after the step of choosing the perceptually significant components.

Correlatively, the extraction step comprises a step of spatio-frequency transformation of the digital image after the step of choosing the perceptually significant components.

Unlike the conventional techniques of watermarking digital images, the choice of the significant components can be made before spectral transformation of the image since the insertion technique is hybrid, that is to say the additional information is inserted on components defined both in space and in frequency, obtained for example by spatio-frequency transformations like discrete block cosine transform type or discrete wavelet transform type.

In practice, the insertion step comprises a step of modifying transformed coefficients where the support of an associated basic synthesis function covers a selected point of interest.

In a similar fashion, the extraction step is performed using transformed coefficients where the support of an associated basic synthesis function covers a selected point of interest.

It is a case then of checking the actual insertion of the additional information by verifying a pre-established rule known to the decoder.

According to one advantageous characteristic, the insertion, or respectively extraction, step comprises a spatio-frequency transformation step implemented in the vicinity of the points of interest selected.

By virtue of this advantageous characteristic, the spatio-frequency decomposition of the image, necessary for inserting or extracting the signature using the spectral components, can be implemented locally in the vicinity of the points of interest rather than on the whole of the image.

In practical terms, the frequency transform can be a discrete block cosine transform of the digital image, used as standardised in the JPEG standard for the processing of fixed images or a discrete wavelet transform.

According to a preferred characteristic of the invention, the insertion method also includes a step of coding said selection information in a selection key.

Correlatively, the extraction method selection step includes a step of decoding a selection key in order to extract selection information for said subset of points of interest.

The use of a selection key characterising the selection of points of interest further reinforces the robustness of the method against intentional attacks.

In practice, the subset of points of interest comprises a triplet of points of interest and the selection information comprises an angle and a distance ratio characterising said triplet of points of interest for geometric transformations of plane similarity types.

In a similar fashion, the invention also concerns in its second aspect a device for inserting additional information, such as a digital signature, in a digital image comprising:

means of detecting the points of interest in said image;

means of selecting a subset of points of interest;

means of calculating a selection information comprising invariant quantities for a class of predetermined geometric transformations, the value of the invariant quantities uniquely characterising said subset of points interest in said image;

means of choosing perceptually significant components to be modified for the insertion of the additional information in the vicinity of said selected points of interest; and means of inserting the additional information by modifying said perceptually significant components.

It also concerns a device for extracting additional information, such as a digital signature, inserted in a digital image comprising:

means of detecting the points of interest in said image;

means of selecting a subset of points of interest according to a selection information comprising invariant quantities for a class of predetermined geometric transformations, the value of the invariant quantities uniquely characterising said subset of points of interest in said image;

means of choosing perceptually significant components modified for inserting the additional information in the vicinity of said selected points of interest; and means of extracting the additional information using said modified perceptually significant components.

These insertion and extraction devices have characteristics and advantages similar to those described above since they are adapted to implement the methods of inserting and extracting additional information in accordance with the second aspect of the invention.

The invention also concerns a computer, an apparatus for processing a digital signal such as a digital image, a digital printer, a digital photographic apparatus and a digital camera having means adapted to implement the insertion method and/or the extraction method according to the first or second aspect of the invention.

These appliances have advantages similar to those described for the methods of inserting and extracting additional information which they implement.

The present invention also relates to an information storage means which can be read by a computer or by a microprocessor, integrated or not into an insertion or extraction device, possibly removable, which stores a program implementing the insertion or extraction method according to the invention.

More particularly, it also relates to a computer program product comprising software code portions for implementing the insertion or extraction method according to the first or the second aspect of the invention.

Other particularities and advantages of the invention will also emerge from the following description of an embodiment of the invention.

BRIEF DESCRIPTION OF THE DRAWINGS

In the accompanying drawings, given by way of non-limitative examples.

DETAILED DESCRIPTION OF THE PREFERRED EMBODIMENTS

Figure 1:
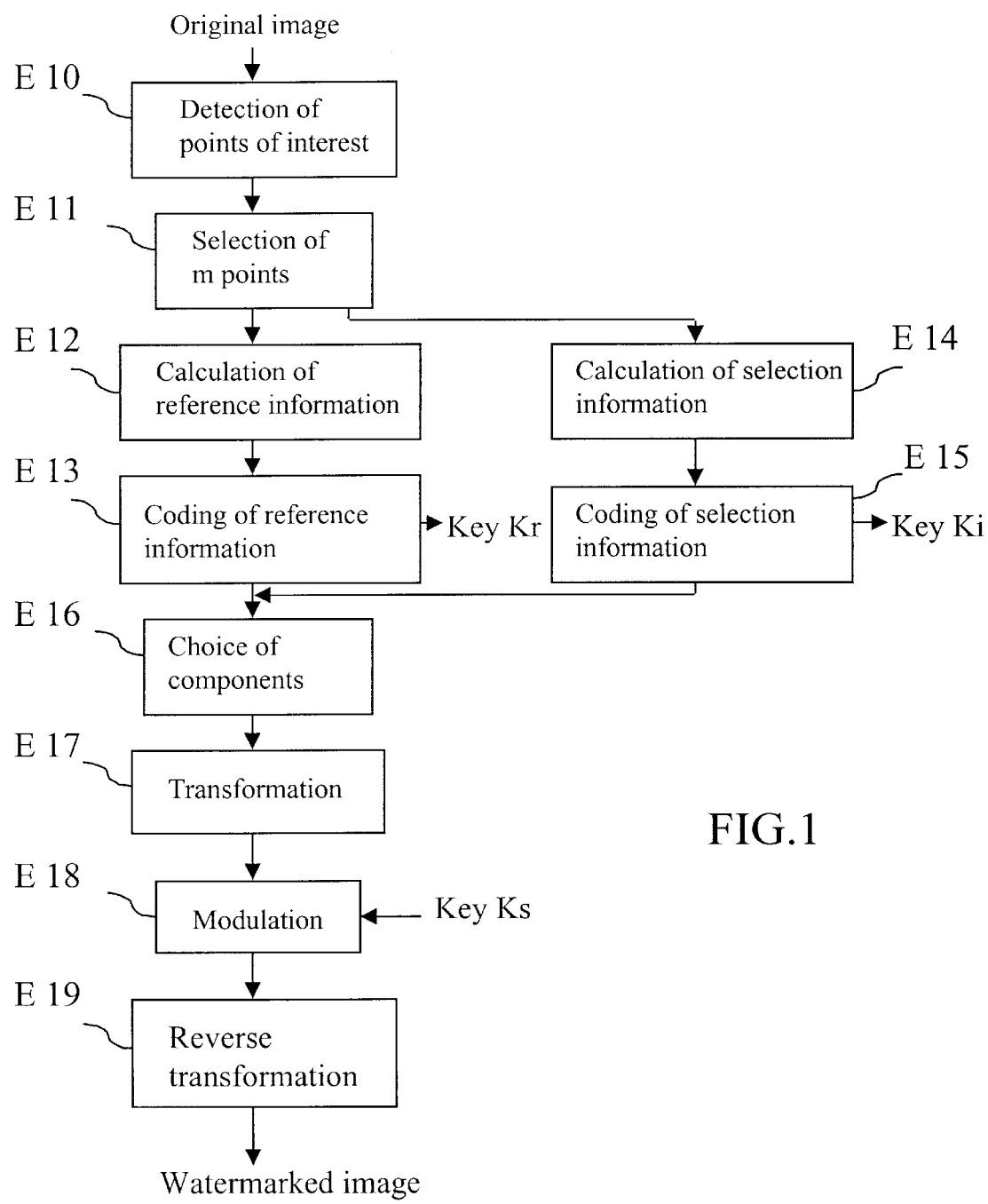
FIG. 1 is an algorithm of the insertion method in accordance with a preferred embodiment of the invention.

A description will be given first of all of the insertion method according to the invention in a preferred embodiment, with reference to FIG. 1.

The purpose of this insertion method is to insert additional information, such as a digital signature, in a digital image, referred to in the remainder of the description as the original image I.

In general terms, the insertion of a digital signature, which can be assimilated to a watermark, makes it possible to insert a seal for authenticating for example the author or provenance of a digital image, even when the latter has undergone various normal operations of digital image processing, such as compression/decompression, analogue to digital conversion and vice versa or various geometric transformations.

The insertion method includes first of all a step E10 of detecting the points of interest in the original image I.

A Harris detector can be used, as described in the article "A combined corner and edge detector" by C. Harris et al, Proc. of the $4^{th}$ Alvey Vision Conference.

Naturally, any other type of detector, and in particular a detector offering increased robustness to conventional geometric transformations, can be used.

The detection is carried out in the luminance domain.

Figure 2:
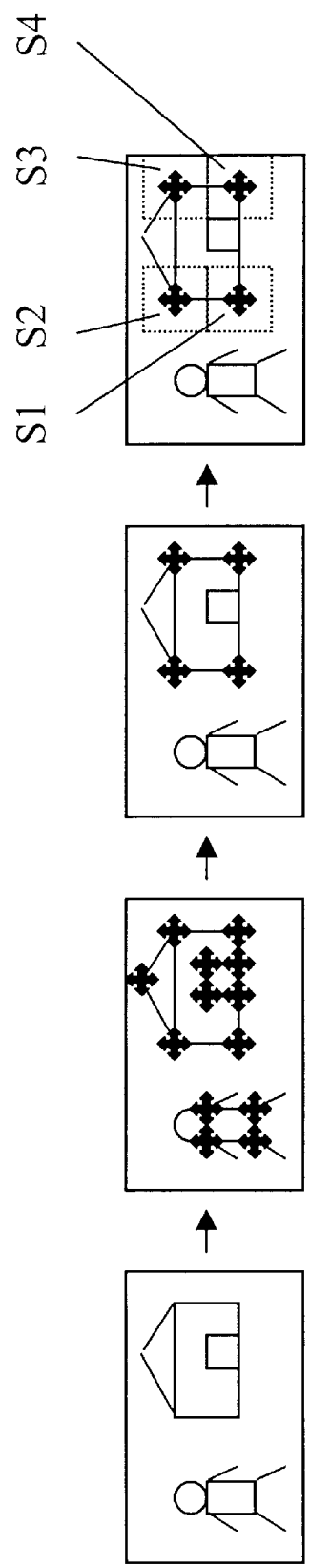
FIG. 2 illustrates the application of the insertion method in accordance with the invention to a digital image.

These points of interest correspond, as illustrated in the second image of FIG. 2, to the points in space where the bidimensional variations in the light intensity are great, such as for example the corners formed by the contours of the image.

A point of interest corresponds to a bidimensional change in the signal. Examples thereof are corners and T junctions, but also the places where the texture varies greatly. Point of interest detectors can be classified into several categories: those based on contours, those based directly on the grey-level signal and those based on theoretical models. A state of the art in point of interest detectors is described in the thesis by Cordelia Schmid, "Matching of images by local invariants of grey levels—application to the indexing of an object base", Institut National Polytechnique of Grenoble, July 1996. The Harris detector is for example a detector based on the grey-level signal. The measurement, that is to say the response of the detector, which indicates whether there is a point of interest at a given place, is calculated directly from the signal.

The method is as follows: at each position a matrix is calculated related to the auto-correlation function of the signal, previously smoothed in order to reduce the influence of noise, which takes into account the values of the first derivatives of the signal on a window. The values peculiar to this matrix are the main curvatures of the auto-correlation function. If these curvatures are great, this indicates the presence of a point of interest.

In this way a set of points of interest is obtained which can if necessary be classified by order of confidence, using for example the magnitude at the output of the detector.

It should be noted that the magnitude must be understood as the response of the point of interest detector and not as the amplitude, for example the luminance, of the pixels themselves.

In a second step E11, a subset of points of interest is selected, consisting of a certain number m of points of interest.

These selected points of interest are adapted in particular to define a geometric reference frame in the image I in a first aspect of the invention.

Figure 3:
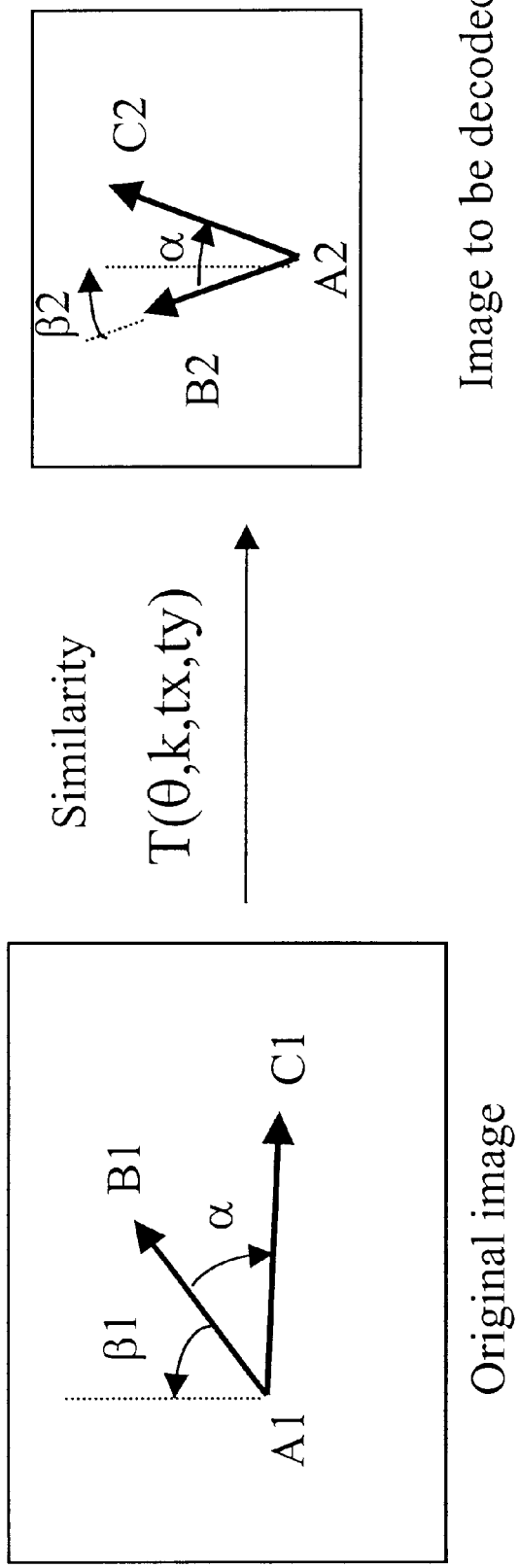
FIG. 3 is a diagram illustrating the modification of a geometric reference frame by plane similarity.

By way of example, and as illustrated in FIG. 3, the subset of points of interest chosen in the original image comprises here a triplet of points of interest A1, B1 and C1.

This triplet of points of interest is characterised according to a second aspect of the invention by invariant quantities for a predetermined class of geometric transformations, here the class of plane similarities produced in the plane of the image I.

It should be stated that a plane similarity is a geometric transformation which can be decomposed into a combination of a rotation through an angle θ, a movement translation tx, ty in two perpendicular directions, for example the vertical direction and the horizontal direction, and a change in scale in accordance with a homothetic transformation factor k.

Invariant quantities for plane similarities are the angles and the distance ratios.

In a calculation step E14, in this way a selection information item is calculated, characterising the triplet of chosen points A1, B1 and C1, this selection information comprising the value of the angle α, in the interval between 0 and π, lying between the segment A1B1 and A1C1, and a distance ratio ρ equal for example to the smallest distance ratio between A1B1 to A1C1 and A1C1 to A1B1.

Thus it is possible to write:

$$\alpha = (\overrightarrow{A1B1}, \overrightarrow{A1C1}) \text{ and } \rho = \min\left(\frac{\|\overrightarrow{A1B1}\|}{\|\overrightarrow{A1C1}\|}, \frac{\|\overrightarrow{A1C1}\|}{\|\overrightarrow{A1B1}\|}\right)$$

A coding step E15 makes it possible to code, in the usual fashion, in a selection key Ki, this selection information consisting here of the value of the two geometric invariants α and ρ.

The triplet of points of interest chosen is such that the values of the invariant quantities α and ρ uniquely characterise the subset of points of interest A1, B1 and C1 amongst the set of points of interest detected at the first detection step E10.

It will be understood that, by increasing the number of points of interest chosen in order to define the geometric reference frame, the reliability of the detection of this reference frame is also increased at the time of the subsequent extraction of the signature. However, a compromise must be found between a number of points sufficient to reliably define the geometric reference frame and the quantity of selection information which it is necessary to calculate, to store in the key Ki and subsequently to decode.

Reference information necessary for determining the geometric transformation applied to the image for the class of geometric transformations of the plane similarity type is next calculated for the geometric reference frame thus selected, in a calculation step E12.

This reference information must be sufficient to make it possible to calculate the geometric transformation parameters applied to the original image I and just sufficient to limit the quantity of reference information to be calculated and stored in a reference key Kr during a coding step E13 using normal information coding techniques.

The reference information necessary and sufficient for geometric transformations of plane similarity types comprises four parameters calculated from the geometric reference frame, characterising an angle, for example the angle β1 formed by the segment A1B1 with the vertical, a distance d1 equal for example to the distance A1B1 and the coordinates of a point of origin of the geometric reference frame in the digital image, for example of the point A1. This reference information can also characterise the coordinates of two points, for example A1 and B1, of the geometric reference frame in the digital image plane.

This reference information can even be limited to two parameters characterising only the angle β1 and the distance d1, the point of interest A1 being chosen as the origin of the reference frame of the modifications during the step of subsequent insertion of the additional information.

Thus it is no longer necessary to estimate the translation in the plane of the original image I.

Next the insertion proper of the additional information in the original image I is effected.

The insertion technique will not be described in detail here since it is well known to persons skilled in the art. Reference can advantageously be made, for example, to the document EP 0 766 468 in the name of NEC CORPORATION, the content of which is incorporated by reference here.

In general terms, the principle of inserting additional information in a digital image consists of inserting this information in characteristics corresponding to perceptually significant components.

There are two classes of component: spatial components, in the domain of representing the image in pixel values, and frequency components obtained by frequency transformation of the image.

When the insertion technique uses a frequency transformation of the image, as described in the document EP 0 766 468, it is conventional to first of all transform the original image, for example by means of a discrete cosine transform by blocks, and then to choose perceptually significant components, for example choosing the spectral coefficients of highest amplitude, to modulate the value of these coefficients in order to insert the additional information, and then to effect an inverse frequency transformation in order to obtain the watermarked image.

In this preferred embodiment of the invention, a step E16 of choosing perceptually significant components to modify for the insertion of the additional information is implemented so that the perceptually significant components are chosen in the vicinity of the selected points of interest.

Unlike the conventional digital data watermarking method, this step of choosing perceptually significant components E16 is effected before the step of frequency transformation E17 of the digital image.

This choosing step E16 can be implemented provided that the frequency transformation used is a transform which produces components which can be termed space-frequency hybrids, localised both in space and in the frequency domain. Such is the case with discrete wavelet decomposition and discrete cosine transforms by blocks.

Figure 4:
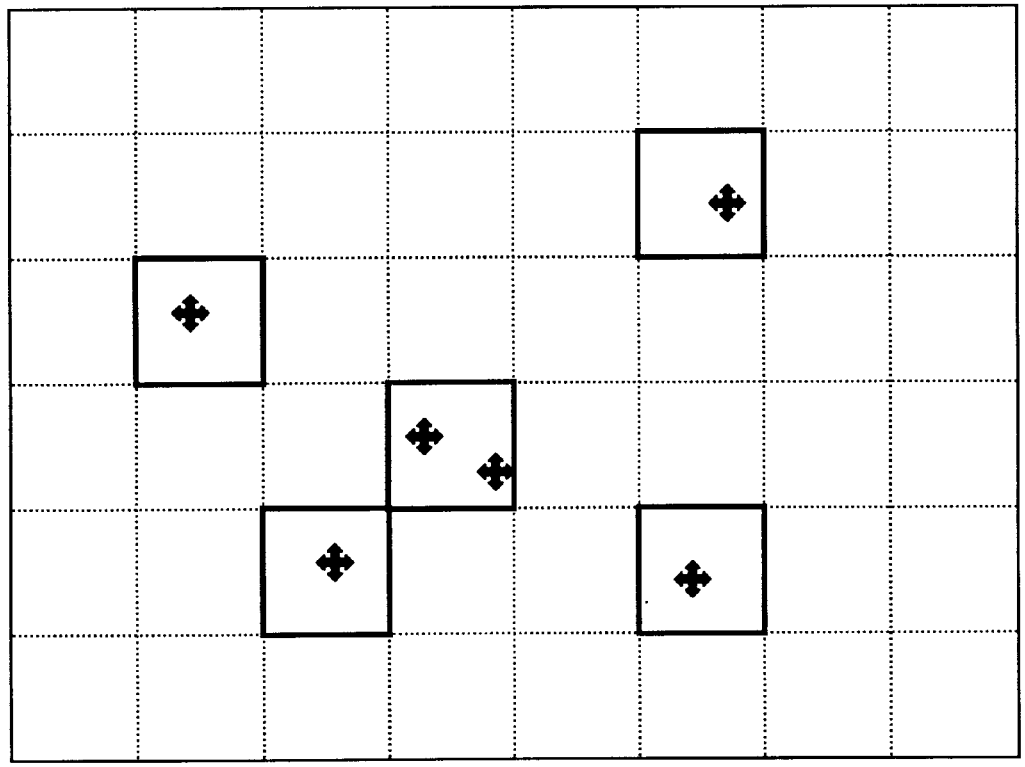
FIG. 4 illustrates the implementation of a frequency transform by blocks of a digital image.
Figure 4:
Figure 4:
Figure 4:
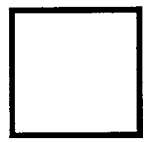

As illustrated in FIG. 4, when the frequency transformation used is a discrete cosine transform by block, a division into blocks is first of all effected, possibly of regular sizes (depicted in dotted lines in FIG. 4).

The points of interest selected at the selection step E11, depicted by crosses in FIG. 4, makes it possible to choose a certain number of blocks (in solid lines) in the vicinity of these points of interest.

In practice, blocks are chosen containing at least one point of interest selected at the selection step E11.

It should also be noted that the number of points selected at the selection step E11 can be different, and notably greater than the number of points of interest selected in order to define a geometric reference frame. In this case, an additional selection information item and a selection key K'i for coding it at the calculation and coding steps E14 and E15 must be used.

However, in order to avoid a multiplicity of keys, in this example as many points of interest for the re-fixing as for the insertion of the additional information are considered. If, for coding the additional information, a number of points greater than a number of points sufficient for the re-fixing are chosen, for example six instead of three points of interest in the case of the re-fixing of plane similarities, this additional information will in any event be beneficial for the robustness of the re-fixing.

A frequency transformation step E17 is then implemented on the selected blocks in order to obtain the spectral components of the image.

It will be noted that the prior choice of the perceptually significant components by virtue of the selected points of interest makes it possible to limit the frequency transformation to the chosen blocks, unlike conventional watermarking techniques which require a frequency transformation of all the blocks.

In this example, a modulation step E18 is implemented in accordance with techniques which are conventional to a person skilled in the art in order to insert the additional information.

Figure 8:
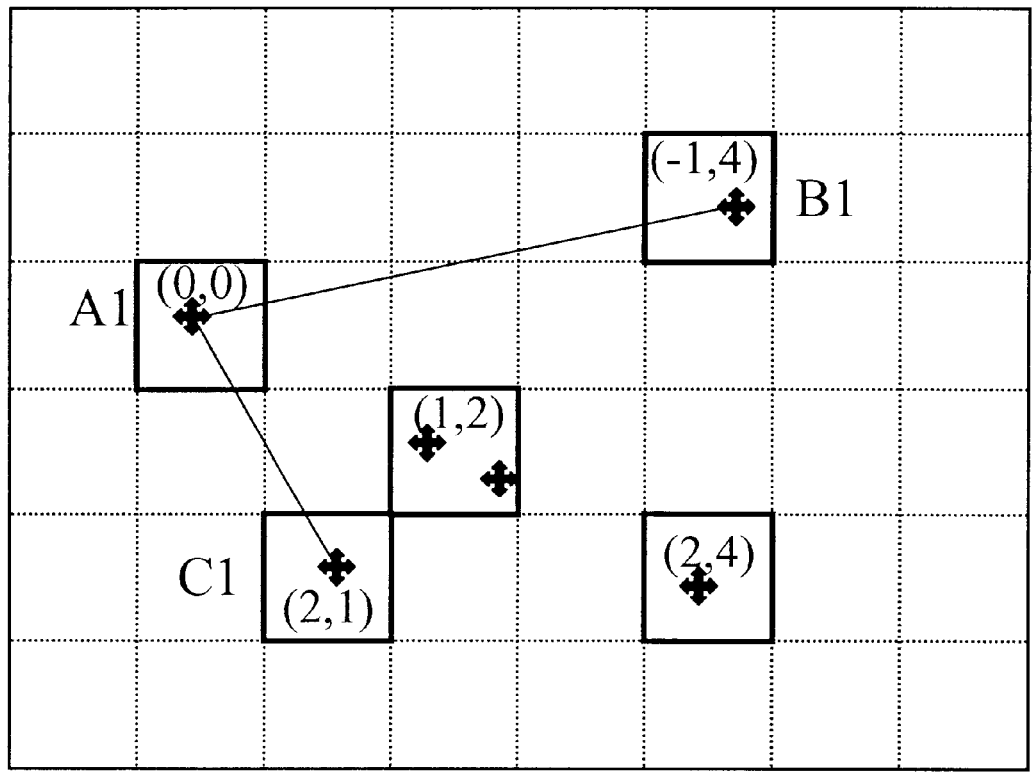
FIG. 8 is a view similar to FIG. 4 illustrating the choice of a modulation reference frame having as its origin a point in the chosen geometric reference frame.
Figure 8:
Figure 8:

As illustrated in FIG. 8, in the case of an insertion in the frequency or spatio-frequency domain, the modulation reference frame in the transformed domain cannot be directly related to the geometric reference frame. On the other hand it is the transformation of the signal itself, that is to say the cosine block transform or the discrete wavelet transform, which must be defined with respect to the chosen geometric reference frame, given a modulation reference frame fixed in the transformed domain. For example, the origin of the transformation of the signal at the origin A1 of the geometric reference frame chosen considering the horizontal and vertical axes as main axes of the transformation, will be chosen.

The coordinates of the blocks are then defined in this modulation reference frame having at its origin the selected point of interest A1.

A secret key Ks can be used in order to guarantee or increase the robustness of the insertion, this key Ks characterising either the insertion means, or the signature itself, for example by identifying the nucleus of a random sequence which constitutes the signature proper.

Next the watermarked image I* is obtained by effecting an inverse frequency decomposition on all the frequency components, modulated or not.

As illustrated in FIG. 2, here four blocks have been chosen for insertion of additional information consisting of a series of four symbols S1, S2, S3 and S4.

A technique of inserting additional information could also be implemented using a discrete wavelet decomposition.

Then a local wavelet transformation is effected in the vicinity of the chosen points of interest. In the case of an insertion technique requiring a wavelet decomposition of the entire image, it is always possible, as illustrated in FIG. 4 for a space-frequency block transformation, to link the location of the transformed coefficients to a spatial location. More precisely, it is a case of considering the representation of the image I(n,m) as wavelets which can be written as follows:

$$I(n,m) = \sum_{\lambda=1}^{\lambda_{max}-1} \sum_{\theta=2}^{4} \sum_{l,k} c_{\lambda,\theta}(l,k) f_{\lambda,\theta}(n-2^\lambda l, m-2^\lambda k) +$$

$$\sum_{\theta=1}^{4} \sum_{l,k} c_{\lambda_{max},\theta}(l,k) f_{\lambda_{max},\theta}(n-2^{\lambda_{max}} l, m-2^{\lambda_{max}} k)$$

where $\lambda$ is the decomposition level index, $\theta$ is the orientation of the sub-band ($\theta$=1 corresponding to the low-pass sub-band), the $c_{\lambda,\theta}(l,k)$ are the transformed coefficients and the $f_{\lambda,\theta}(n,m)$ are the basic synthesis functions of the representation. From this point of view, each transformed coefficient $c_{\lambda,\theta}(l,k)$ has a spatial location defined in the pixel space by the support of the basic synthesis function $f_{\lambda,\theta}(n-2^\lambda l, m-2^\lambda k)$. This support is normally finite since normally transformation filters with a finite pulse-type response are used. A possible insertion method is then to consider for the modulation only the coefficients where the support of the associated basic synthesis function covers a selected point of interest.

Likewise, as illustrated in FIG. 4 for a block type transformation, the image representation of such a block transformation can also be written as follows:

$$I(n,m) = \sum_{i=1,j=1}^{M} \sum_{l,k} c_{i,j}(l,k) f_{i,j}(n-2^M l, m-2^M k)$$

where i and j are the indices of the transformed block and M corresponds to the size of the block. The coefficients where the support of the associated basic synthesis function covers a point of interest selected for the insertion of the additional information are also considered for the modulation.

The extraction of this information in an input image J will now be described.

This input image J corresponds to the watermarked image I*, which has been able to undergo possible transformations, for example a compression and decompression of the image I* with a view to its storage and a geometric transformation of the plane similarity type.

In general terms, an attempt is made to extract the inserted signature in order to compare it with the signature actually inserted by the insertion method and to check their similarity in order to authenticate the image, its author or its origin.

Figure 5:
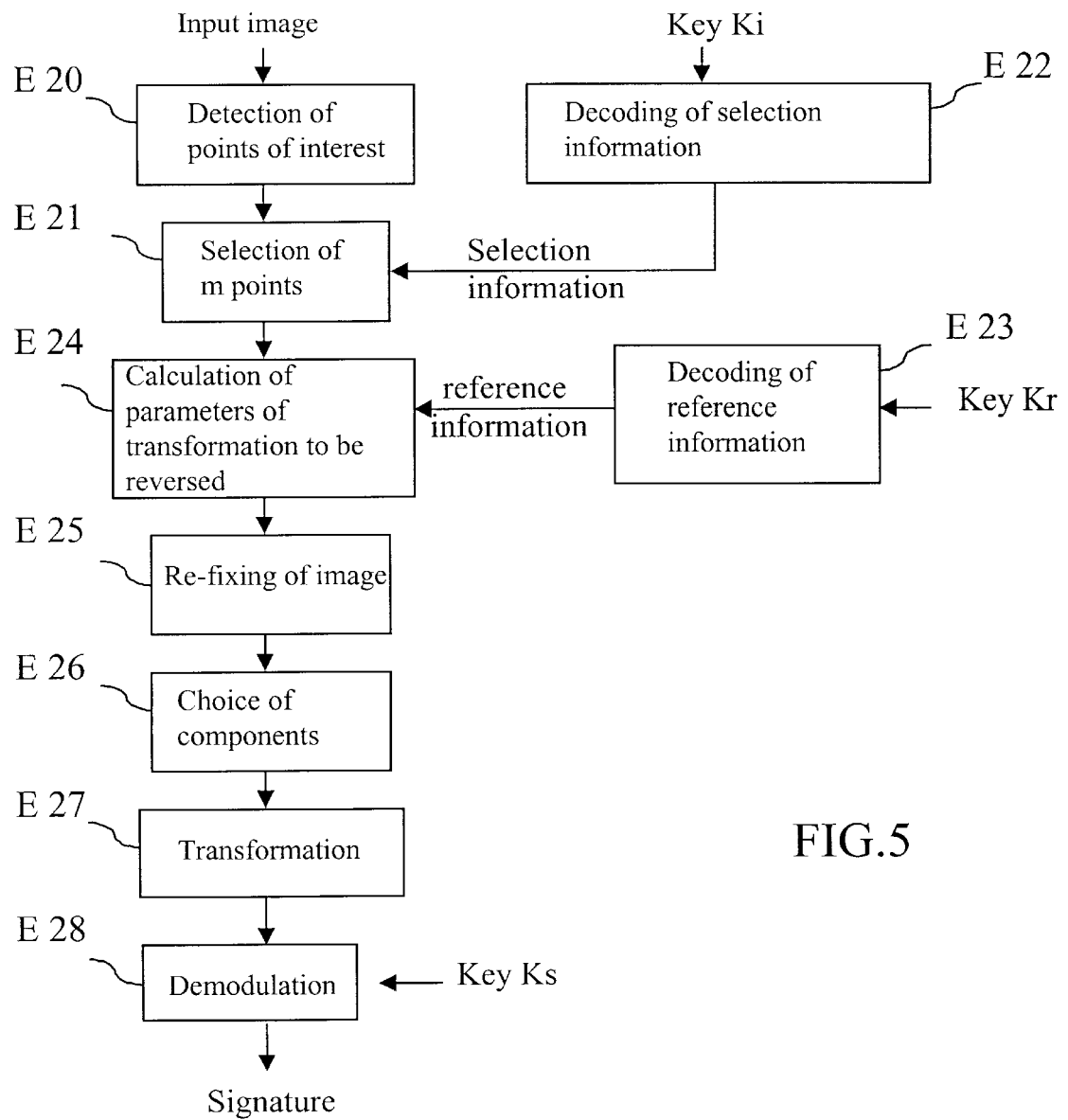
FIG. 5 is an algorithm of the extraction method in accordance with a preferred embodiment of the invention.

As illustrated in FIG. 5, this extraction method includes first of all a step E20 of detecting the points of interest in the image J.

This detection step E20 is identical to the one E10 described with reference to the insertion method.

As the points of interest have the particularity being substantially invariant to all the processings (geometric transformation, frequency transformation, compression/decompression etc) which the image may undergo, all the points of interest detected in the original image I are found.

Next, in a selection step, a subset of points of interest adapted to define a geometric reference frame in the image J is chosen.

Use is made of selection criteria identical to those used during the insertion of the additional information in the original digital image, during the selection step E11.

For this purpose, a step E22 of decoding the selection key Ki makes it possible to find the selection information.

In this example, the value of the geometric invariants, the angle $\alpha$ and the distance ratio $\rho$ defined above, makes it possible to find a triplet of points A2, B2 and C2 corresponding to the geometric reference frame A1, B1 and C1 which underwent a geometric transformation of the plane similarity type.

A step E23 of decoding the reference key Kr extracts the reference information necessary for determining the geometric transformation applied to the original digital image.

This necessary reference information is here limited to the value of the angle $\beta1$ and the distance d1 calculated from the points A1 and B1 and from the vertical.

A step E24 of calculating the parameters of the geometric transformation applied to the original image I is used from the subset of points of interest A2, B2 and C2 and from the extracted reference information, the angle $\beta1$ and the distance d1.

In practice, the value of the angle β2 formed by the segment A2B2 with the vertical and the distance d2 between the points A2 and B2 are calculated.

It is then possible to calculate the angle of rotation θ and the homothetic transformation factor k characterising the plane similarity applied to the original image I by means of the following formulae:

$$\theta = \beta 1 - \beta 2 \text{ and } k = \frac{\|\overline{A2B2}\|}{\|\overline{A1B1}\|}$$

It should also be noted that two points A1, B1 and A2, B2 suffice to determine the parameters of the plane similarity, the third points C1 and C2 being used to afford a more reliable detection of the points of interest forming the geometric reference frame from geometric variants.

If more than three points have been selected for a greater robustness of the re-fixing, then the estimation of the parameters of the geometric transformation can be effected by a procedure of the least error squares type.

Figure 6:
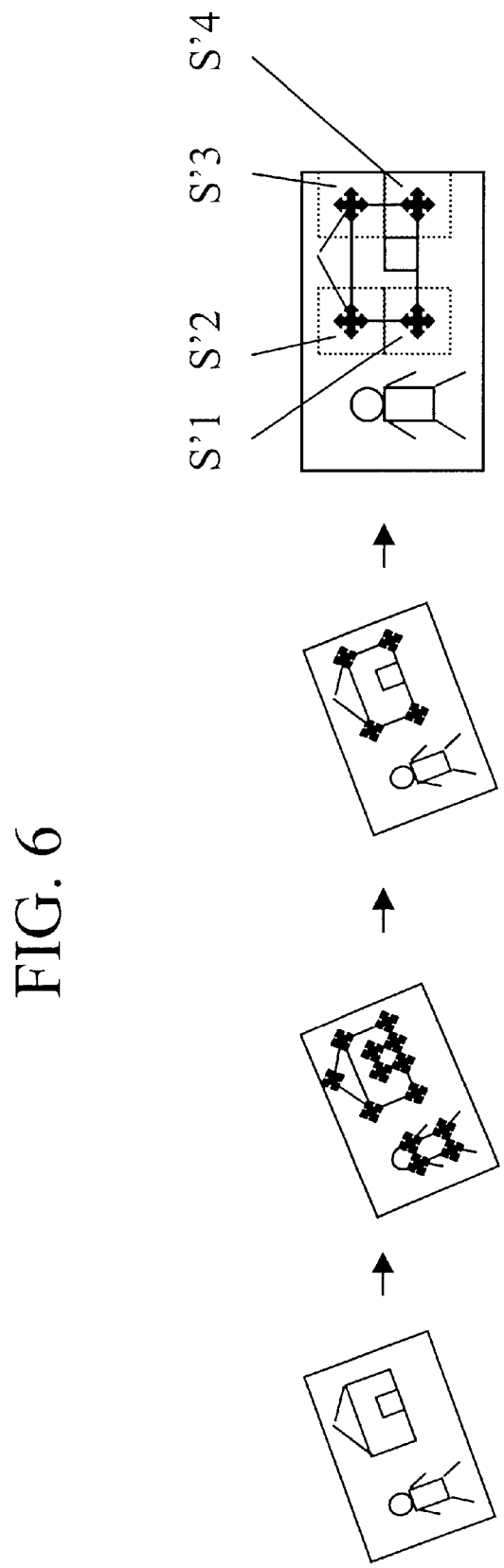
FIG. 6 illustrates the application of the extraction method according to the invention to a digital image.

As illustrated in FIG. 6, a refixing of the image J is then effected in a step E25, applying to the image J a homothetic transformation factor k' which is the inverse of k and a rotation through an angle θ' opposite to the angle θ.

k'=1/k andθ'=−θ

The extraction proper of the additional information from the re-fixed image is then carried out.

The step of extracting additional information comprises a step E26 of choosing perceptually significant components which have in this example been modulated for insertion of the additional information, these perceptually significant components being chosen in the vicinity of the selected points of interest.

A spatio-frequency transformation step E27, here using a discrete cosine transformation by blocks of the re-fixed image, is used after the step E26 of choosing the perceptually significant components.

These steps are similar to the steps of choosing E16 and frequency transformation E17 described for the insertion method and are not described in detail here.

The choosing step E26 gives the same blocks as at the choosing step E26 of the insertion method, using the same subset of points selected at step E21.

A step E27 of demodulating the spectral components extracts the inserted signature, using the same key Ks as that used for insertion of the signature.

As illustrated in FIG. 6, the choosing step E26 gives the blocks of the image in which the insertion of the additional information was effected and the demodulation step extracts the signature S' consisting of the symbols S'1, S'2, S'3 and S'4.

A conventional step of calculating similarity between the set S1, S2, S3 and S4 and the set S'1, S'2, S'3 and S'4 authenticates or not the image J as corresponding to the original image I.

Figure 7:
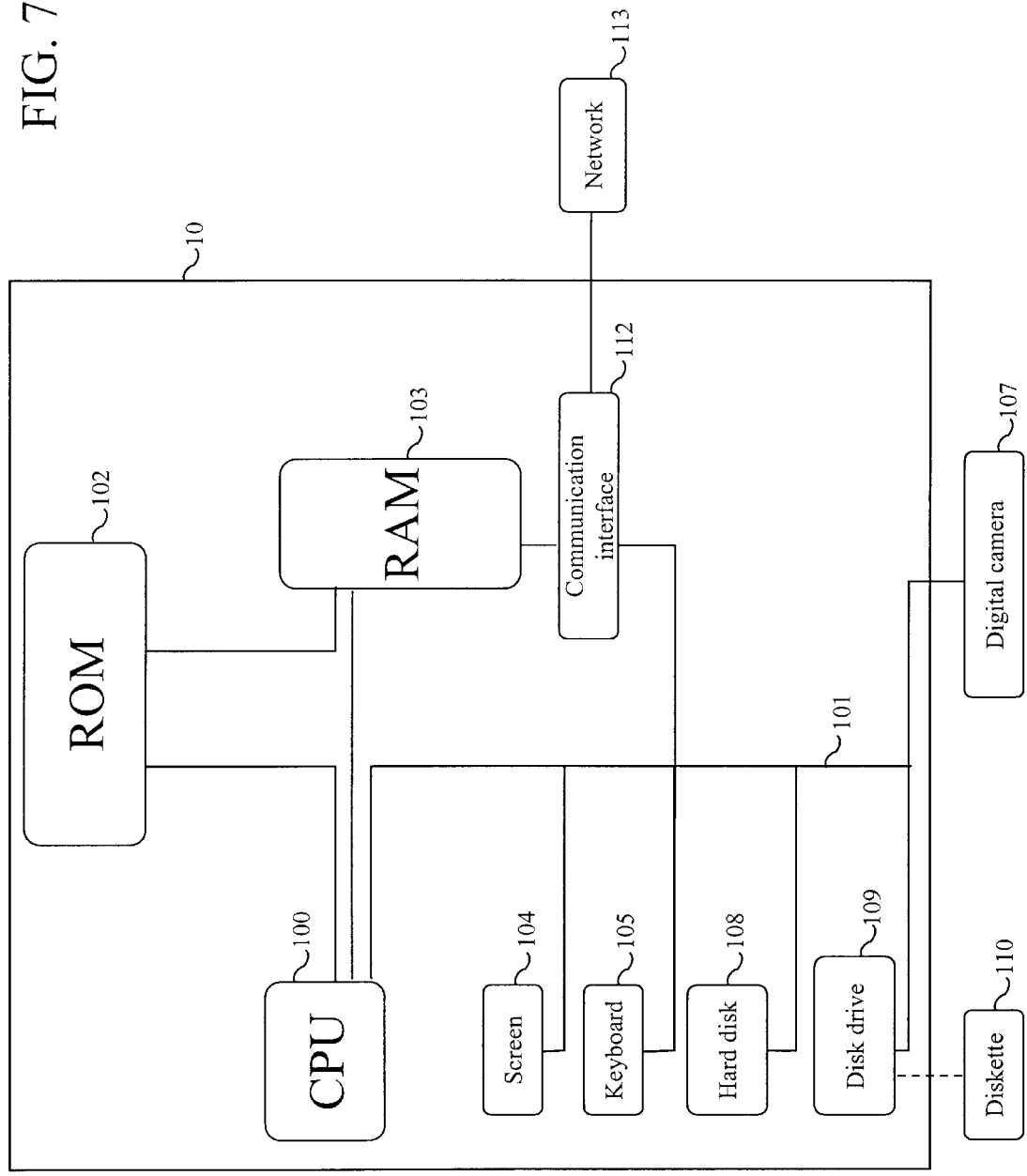
FIG. 7 is a block diagram illustrating a device adapted to implement the insertion and extraction methods according to the invention.

The methods thus described of inserting and extracting a signature can be implemented in a device as illustrated in FIG. 7.

This device can for example be a microcomputer 10 adapted to implement both the insertion method and the extraction method in accordance with the invention.

Naturally, devices may implement only one or other of these two methods.

The computer 10 has a microprocessor 100, a read only memory 102 containing a program for inserting and extracting additional information and a random access memory 103 containing registers for recording variables modified during the running of the program.

An insertion device and an extraction device are incorporated in the microprocessor 100.

The insertion device has notably:
  means 100, 102, 103 of detecting the points of interest in the image;
  means 100, 102, 103 of selecting a subset of points of interest adapted to define a geometric reference frame in the image;
  means 100, 102, 103 of calculating information for selecting the subset of points of interest;
  means 100, 102, 103 of coding selection information in a selection key;
  means 100, 102, 103 of calculating, for the geometric reference frame, reference information necessary for determining the geometric transformation applied to the image for a class of predetermined geometric transformations;
  means 100, 102, 103 of coding reference information in a reference key; and
  means 100, 102, 103 of inserting additional information in the digital image comprising means of choosing perceptually significant components to be modified for inserting the additional information adapted to choose the perceptually significant components in the vicinity of the selected points of interest, and means for the spatio-frequency transformation of the digital image.

The extraction device has notably:
  means 100, 102, 103 of detecting the points of interest in an image;
  means 100, 102, 103 of decoding a selection key for extracting selection information for a subset of points of interest;
  means 100, 102, 103 of selecting a subset of points of interest adapted to define a geometric reference frame in the image according to selection criteria identical to those used during the insertion of the additional information in the original digital image;
  means 100, 102, 103 of decoding a reference key for extracting reference information necessary for determining the geometric transformation applied to the original digital image;
  means 100, 102, 103 of calculating the parameters of the geometric transformation applied to the original image from the subset of points of interest and the extracted reference information;
  means 100, 102, 103 of re-fixing the digital image by applying a reverse geometric transformation determined from the calculated parameters; and
  means 100, 102, 103 of extracting additional information in the re-fixed image comprising means of choosing perceptually significant components modified for inserting the additional information adapted to choose the perceptually significant components in the vicinity of the selected points of interest, and means for the spatio-frequency transformation of the digital image.

The computer 10 can be connected to different peripherals, for example a digital camera 107 (or a scanner, a digital photographic apparatus or any other apparatus for acquiring or storing images), connected to a graphics card and adapted to supply digital images to be watermarked with a signature or to be authenticated from an inserted signature.

The computer 10 has a communication interface 112 connected to a network 113 able to transmit digital information to be watermarked with a signature or to be authenticated.

A storage means such as a hard disk 108 or a diskette 110 can also contain digital data to be watermarked or to be authenticated by the insertion and extraction methods in accordance with the invention.

A disk drive 109 is provided for reading the diskettes 110.

The program adapted to implement the insertion and extraction methods can be stored on the hard disk 108. It can also be stored on a diskette 110, and then, once read by the computer, stored on the hard disk 108.

As a variant, the program can be transmitted by the communication network 113 and, once read, stored on the hard disk 108.

The computer 10 also has a screen 104 for displaying the information to be watermarked or serving as an interface with a user, who can for example interactively choose the points of interest defining the geometric reference frame.

A keyboard 105 or any other means (a mouse for example) enables the user to communicate with the computer 10.

The microprocessor or central unit 100 will execute the instructions relating to the implementation of the insertion and extraction methods in accordance with the invention.

When the computer 10 is switched on, the programs stored in one of the non-volatile memories, for example the read only memory 102, are transferred into the random access memory 103, which will then contain the executable code for inserting additional information or extracting inserted information, as well as the variables necessary for running the programs.

The random access memory 103 contains notably registers for storing all the points of interest detected, the chosen subset and the selection key Ki, the reference key Kr, the choice of perceptually significant components and the secret key Ks. It also contains registers for storing in addition the decoded selection information, the parameters of the geometric transformation to be reversed and the extracted signature S'.

The communication bus 101 affords communication between the different sub-elements of the computer 10 or connected to it. The representation of the bus 101 is not limitative and notably the central unit or microprocessor 100 is able to communicate instructions to any sub-element of the computer 10 directly or by means of another sub-element.

Naturally, numerous modifications could be made to the example embodiment described above without departing from the scope of the invention.

Thus the choice of points of interest for defining a geometric reference frame and the storage of reference information for re-fixing the image before extracting the inserted signature can be implemented whereas the choice of significant components for inserting the signature does not use a subset of points of interest. In particular, the choice of the perceptually significant components can be made in a conventional fashion after spectral decomposition of the digital image, choosing the frequency components with the greatest magnitude.

Moreover, the points of interest in the image can be selected interactively by an operator, for example by means of the keyboard or mouse connected to a computer having a device for inserting and extracting a digital signature. The selection information then comprises the criteria of this interactive selection guided by the operator and can be coded in a selection key Ki as described previously.

It could also be envisaged that the points of interest be selected by comparing their magnitude calculated from the measured amplitude by the points of interest detector so that a certain number m of points of interest with the greatest magnitudes are selected, for example 3 points.

The same re-fixing principle can also be applied to other types of geometric transformation such as affine or projective transformations for which geometric invariants also exist. Nevertheless, since these transformations have more parameters, it is necessary to consider a greater number of points of interest.

Moreover, the choice of significant components for inserting the signature using a subset of points of interest can be implemented without defining a geometric reference frame and storing reference information for refixing the image before extracting the inserted signature. In particular, the image can be refixed in a conventional manner using the original image if the latter is available at the extraction device.

In addition the insertion and extraction methods in accordance with the invention also apply with techniques of inserting additional information by modification of coefficients according to a predetermined rule, known to the decoder.

What is claimed is:

1. Method of inserting an additional digital signal in digital data corresponding to an image (I), characterised in that it comprises the following steps:

detecting (E10) points of interest in said image (I), the points of interest corresponding to some points of the image where bidimensional variations in light intensity are greater than a threshold;

selecting (E11) a subset of points of interest (A1, B1, C1) adapted to define a geometric reference frame in said image (I);

calculating (E12), for the geometric reference frame, reference information necessary for determining the geometric transformation applied to the image for a class of predetermined geometric transformations;

coding (E13) said reference information in a reference key (Kr); and inserting (E16–E19) only the additional digital signal in said digital data.

2. Insertion method according to claim 1, characterised in that the reference information necessary and sufficient for geometric transformations of plane similarity types comprises four parameters calculated from the geometric reference frame.

3. Insertion method according to claim 2, characterised in that said four parameters define either an angle ($\beta 1$), a distance (d1), and two coordinates of a point of origin (A1) of the geometric reference frame in the digital image; or two coordinates of a first point of the geometric reference frame in the digital image, and two coordinates of a second point of the geometric reference frame in the digital image.

4. Insertion method according to claim 1, characterised in that the reference information is limited to two parameters defining an angle ($\beta 1$) and a distance (d1), and wherein a predetermined point of interest (A1) amongst the subset of points of interest selected (A1, B1, C1) is chosen as the origin of the reference frame of the modifications during the step of inserting the additional information.

5. Insertion method according to one of claims 1 to 4, characterised in that it also includes a step (E14) of calculating selection information for said subset of points of interest and a step (E15) of coding said selection information in a selection key (Ki).

6. Insertion method according to claim 5, characterised in that the selection information comprises invariant quantities ($\alpha$, $\rho$) for said class of predetermined geometric transformations, the value of the invariant quantities uniquely characterising a subset of points of interest (A1, B1, C1) in said image.

7. Insertion method according to claim 6, characterised in that the sub-set of points of interest comprises a triplet of points of interest (A1, B1, C1) and in that the selection information comprises an angle ($\alpha$) and a distance ratio ($\rho$) characterising said triplet of points of interest for geometric transformations of plane similarity types.

8. Insertion method according to claim 5, characterised in that the selection information comprises criteria of an interactive selection guided by an operator.

9. Insertion method according to one of claims 1 to 4, characterised in that, at the selection step, the points of interest with the greatest magnitudes at the output of a point of interest detector are selected.

10. Insertion method according to one of claims 1 to 4, characterised in that the step of inserting additional information comprises a step (E16) of choosing perceptually significant components to be modified for inserting the additional information, said perceptually significant components being chosen in the vicinity of said selected points of interest (A1, B1, C1).

11. Insertion method according to claim 10, characterised in that the insertion step comprises a step of spatio-frequency transformation (E17) of the digital image (I) after the step (E16) of choosing the perceptually significant components.

12. Method of inserting additional information in a digital image (I), characterised in that it comprises the following steps:
   detecting (E10) the points of interest in said image (I);
   selecting (E11) a subset of points of interest;
   calculating (E14) a selection information comprising invariant quantities ($\alpha$, p) for a class of predetermined geometric transformations, the value of the invariant quantities ($\alpha$, p) uniquely characterising said subset of points of interest in said image (I);
   choosing (E16) perceptually significant components to be modified for inserting the additional information in the vicinity of said selected points of interest; and
   inserting (E17–E19) the additional information by modifying said perceptually significant components.

13. Insertion method according to claim 12, characterised in that the insertion step comprises a step of spatio-frequency transformation (E17) of the digital image (I) after the step (E16) of choosing the perceptually significant components.

14. Insertion method according to claim 13, characterised in that the insertion step comprises a step of modifying transformed coefficients where the support of an associated basic synthesis function covers a selected point of interest.

15. Insertion method according to one of claims 12 to 14, characterised in that the insertion step comprises a frequency transformation step (E17) implemented in the vicinity of the selected points of interest.

16. Insertion method according to one of claims 12 to 14, characterised in that it also includes a step (E15) of coding said selection information in a selection key (Ki).

17. Insertion method according to one of claims 12 to 14, characterised in that the subset of points of interest comprises a triplet of points of interest (A1, B1, C1) and in that an item of selection information comprises an angle ($\alpha$) and a distance ratio ($\rho$) characterising said triplet of points of interest for geometric transformations of plane similarity types.

18. Method of extracting an additional digital signal inserted in a digital image (J), characterised in that it comprises the following steps:
   detecting (E20) points of interest in said image (J), the points of interest corresponding to some points of the image where bidimensional variations in light intensity are greater than a threshold;
   selecting (E21) a subset of points of interest (A2, B2, C2) adapted to define a geometric reference frame in said image (J) in accordance with selection criteria identical to those used during the insertion of the additional digital signal in an original digital image (I);
   decoding (E23) a reference key (Kr) in order to extract reference information necessary for determining the geometric transformation applied to the original digital image;
   calculating (E24) the parameters of the geometric transformation applied to the original image (I) from said subset of points of interest (A2, B2, C2) and the reference information extracted;
   re-fixing (E25) the digital image by applying an inverse geometric transformation determined from the calculated parameters; and
   extracting (E26–E28) said additional digital signal (S') from the re-fixed image.

19. Extraction method according to claim 18, characterised in that the reference information comprises four parameters characterising an angle ($\beta 1$), a distance (d1) and the coordinates of a point of origin (A1) of said geometric reference frame or the coordinates of two points of said geometric reference frame, and in that, at the calculation step (E24), the parameters of the geometric transformation are, for geometric transformations of plane similarity types, an angle of rotation (0), a homothetic transformation factor (k) and a translational movement (tx, ty) in two perpendicular directions of the digital image.

20. Extraction method according to claim 18, characterised in that the reference information is limited to two parameters characterising an angle ($\beta 1$) and a distance (d1) and in that, at the calculation step (E24), the parameters of the geometric transformation are an angle of rotation ($\theta$) and a homothetic transformation factor (k), a predetermined point of interest (A2) amongst the subset of points of interest selected being chosen as the origin of the reference frame of the modifications during the step of extracting the additional information in the fixed image.

21. Extraction method according to one of claims 18 to 20, characterised in that the selection step includes a step (E22) of decoding a selection key (Ki) for extracting selection information for said subset of points of interest (A2, B2, C2).

22. Extraction method according to claim 21, characterised in that the selection information comprises invariant quantities ($\alpha$, $\rho$) for a class of predetermined geometric transformation, the value of the invariant quantities ($\alpha$, $\rho$) uniquely characterising a subset of points of interest in said image.

23. Extraction method according to claim 22, characterised in that the subset of points of interest comprises a triplet of points of interest (A2, B2, C2) and in that the selection information comprises an angle ($\alpha$) and a distance ratio ($\rho$) characterising said triplet of points of interest (A2, B2, C2) for geometric transformations of plane similarity types.

24. Extraction method according to claim 21, characterised in that the selection information comprises criteria of an interactive selection guided by an operator.

25. Extraction method according to one of claims 18 to 20, characterised in that, at the selection step (E21), the points of interest with the greatest magnitude at the output of a point of interest detector are selected.

26. Extraction method according to one of claims 18 to 20, characterised in that the step of extracting additional information comprises a step (E26) of choosing perceptually significant components modified for inserting the additional information, said perceptually significant components being chosen in the vicinity of said selected points of interest (A2, B2, C2).

27. Extraction method according to claim 26, characterised in that the extraction step comprises a step of spatio-frequency transformation (E27) of the digital image after the step of choosing the perceptually significant components.

28. Method of extracting additional information inserted in a digital image (J), characterised in that it comprises the following steps:
   detecting (E20) the points of interest in said image (J);
   selecting (E21) a subset of points of interest according to a selection information comprising invariant quantities ($\alpha$, $\rho$) for a class of predetermined geometric transformations, the value of the invariant quantities ($\alpha$, $\rho$) uniquely characterising said subset of points of interest in said image;
   choosing (E26) perceptually significant components modified for inserting the additional information in the vicinity of the said selected points of interest; and
   extracting (E27–E28) the additional information from said modified perceptually significant components.

29. Extraction method according to claim 28, characterised in that the extraction step comprises a step of spatio-frequency transformation (E27) of the digital image (J) after the step (E26) of choosing perceptually significant components.

30. Extraction method according to claim 29, characterised in that the extraction step is performed using transformed coefficients where the support of an associated basic synthesis function covers a selected point of interest.

31. Extraction method according to one of claims 28 to 30, characterised in that the extraction step comprises a frequency transformation step implemented in the vicinity of the selected points of interest.

32. Extraction method according to one of claims 28 to 30, characterised in that the selection step includes a step (E22) of decoding a selection key (Ki) for extracting selection information for said subset of points of interest.

33. Extraction method according to one of claims 28 to 30, characterised in that the subset of points of interest comprises a triplet of points of interest (A2, B2, C2) and in that the selection information comprises an angle ($\alpha$) and a distance ratio ($\rho$) characterising said triplet of points of interest (A2, B2, C2) for geometric transformations of plane similarity types.

34. Device for inserting an additional digital signal in digital data corresponding to an image, characterised in that it comprises:
   means for detecting points of interest in said image, the points of interest corresponding to some points of the image where bidimensional variations in light intensity are greater than a threshold;
   means for selecting (100, 102, 103) a subset (A1, B1, C1) of points of interest adapted to define a geometric reference frame in said image (I);
   means for calculating (100,102,103), for the geometric reference frame, reference information necessary for determining the geometric transformation applied to the image for a class of predetermined geometric transformations;
   means for coding (100, 102, 103) said reference information in a reference key (Kr); and
   means (100, 102, 103) for inserting only the additional digital signal in said digital data.

35. Insertion device according to claim 34, characterised in that it also has means (100, 102, 103) for calculating selection information for said subset of points of interest (A1, B1, C1) and means (100, 102, 103) for coding said selection information in a selection key (Ki).

36. Insertion device according to one of claims 34 or 35, characterised in that the means for inserting additional information comprises means (100, 102, 103,) for choosing perceptually significant components to be modified for inserting the additional information and adapted to choose said perceptually significant components in the vicinity of said selected points of interest.

37. Insertion device according to claim 36, characterised in that the insertion means comprises means for the spatio-frequency transformation (100,102,103) of the digital image (I).

38. Device for inserting additional information in a digital image (I), characterised in that it has:
   means (100, 102, 103) of detecting the points of interest in said image;
   means (100,102,103) of selecting a subset of points of interest;
   means (100, 102, 103) of calculating a selection information comprising invariant quantities ($\alpha$, $\rho$) for a class of predetermined geometric transformations, the value of the invariant quantities ($\alpha$, $\rho$) uniquely characterising said subset of points interest in said image (I);
   means (100, 102, 103) of choosing perceptually significant components to be modified for the insertion of the additional information in the vicinity of said points of interest selected; and
   means (100, 102, 103) of inserting the additional information by modifying said perceptually significant components.

39. Insertion device according to claim 38, characterised in that the insertion means comprise means for the spatio-frequency transformation (100,102,103) of the digital image (I).

40. Insertion device according to one of claims 38 or 39, characterised in that the insertion means comprise means of modifying transformed coefficients where the support of an associated basic synthesis function covers a selected point of interest.

41. Insertion device according to one of claims 38 to 39, characterised in that it also includes means (100, 102, 103) of coding said selection information in a selection key (Ki).

42. Insertion device according to one of claims 34, 35, 38 or 39, characterised in that it is incorporated in a microprocessor (100), a read only memory (102) containing a program for inserting additional information in a digital image (I) and a random access memory (103) containing registers adapted to record variables modified during the running of the program.

43. Device for extracting an additional digital signal inserted in a digital image, characterised in that it comprises:
   means for detecting (100, 102, 103) points of interest in said image (J), the points of interest corresponding to some points of the image where bidimensional variations in light intensity are greater than a threshold;

means for selecting (100, 102, 103) a subset of points of interest (A2, B2, C2) adapted to define a geometric reference frame in said image (J) in accordance with selection criteria identical to those used during the insertion of the additional digital signal in an original image (I);

means for decoding (100, 102, 103) a reference key (Kr) in order to extract reference information necessary for determining the geometric transformation applied to the original digital image (I);

means for calculating (100, 102, 103) the parameters of the geometric transformation applied to the original image from said subset of points of interest (A2, B2, C2) and the reference information extracted;

means for re-fixing (100, 102, 103) the digital image (J) by applying an inverse geometric transformation determined from the calculated parameters; and means for extracting (100,102,103) said additional digital signal in the re-fixed image.

44. Extraction device according to claim 43, characterised in that it also has means (100, 102, 103) for decoding a selection key for extracting selection information (Ki) for said subset of points of interest (A2, B2, C2).

45. Extraction device according to one of claims 43 or 44, characterised in that the means for extracting additional information comprises means (100, 102, 103) for choosing perceptually significant components modified for inserting the additional information and adapted to choose said perceptually significant components in the vicinity of said selected points of interest.

46. Extraction device according to claim 45, characterised in that the extraction means comprises means for the spatio-frequency transformation (100, 102, 103) of the digital image (I).

47. Device for extracting additional information inserted in a digital image (J), characterised in that it has:

means (100, 102, 103) of detecting the points of interest in said image (J);

means (100, 102, 103) of selecting a subset of points of interest according to a selection information comprising invariant quantities ($\alpha, \rho$) for a class of predetermined geometric transformations, the value of the invariant quantities ($\alpha, \rho$) uniquely characterising said subset of points of interest in said image;

means (100, 102, 103) of choosing perceptually significant components modified for inserting the additional information in the vicinity of said points of interest selected; and means (100, 102, 103) of extracting the additional information using said modified perceptually significant components.

48. Extraction device according to claim 47, characterised in that the extraction means comprise means (100, 102, 103) for the spatio-frequency transformation of the digital image.

49. Extraction device according to one of claims 47 or 48, characterised in that the extraction means are adapted to effect the extraction of the additional information from transformed coefficients where the support of an associated basic synthesis function covers a selected point of interest.

50. Extraction device according to one of claims 47 or 48, characterised in that the selection means (100, 102, 103) include means (100, 102, 103) of decoding a selection key (Ki) for extracting selection information for said subset of points of interest.

51. Extraction device according to one of claims 43, 44, 47 or 48, characterised in that it is incorporated in a microprocessor (100), a read only memory (102) containing a program for extracting additional information and a random access memory (103) containing registers adapted to record variables modified during the running of the program.

52. Computer, characterised in that it has means adapted to implement the insertion method according to one of claims 1 to 4, 12 or 13.

53. Computer, characterised in that it has means adapted to implement the extraction method according to one of claims 18 to 20 or 28 to 30.

54. Apparatus for processing a digital signal such as a digital image, characterised in that it has means adapted to implement the insertion method according to one of claims 1 to 4, 12 or 13.

55. Apparatus for processing a digital signal such as a digital image, characterised in that it has means adapted to implement the extraction method according to one of claims 18 to 20 or 28 to 30.

56. Digital printer, characterised in that it is connected to an apparatus to implement the insertion method according to one of claims 1 to 4, 12 or 13.

57. Digital printer, characterised in that it is connected to an apparatus to implement the extraction method according to one of claims 18 to 20 or 28 to 30.

58. Digital photographic apparatus, characterised in that it is connected to an apparatus to implement the insertion method according to one of claims 1 to 4, 12 or 13.

59. Digital photographic apparatus, characterised in that it is connected to an apparatus to implement the extraction method according to one of claims 18 to 20 or 28 to 30.

60. Digital camera, characterised in that it is connected to an apparatus to implement the insertion method according to one of claims 1 to 4, 12 or 13.

61. Digital camera, characterised in that it is connected to an apparatus to implement the extraction method according to one of claims 18 to 20 or 28 to 30.

62. Computer program product, characterised in that it comprises software code portions; for implementing the insertion method according to one of claims 1 to 4, 12 or 13.

63. Computer program product, characterised in that it comprises software code portions for implementing extraction method according to one of claims 18 to 20 or 28 to 30.

* * * * *

UNITED STATES PATENT AND TRADEMARK OFFICE
CERTIFICATE OF CORRECTION

PATENT NO.   : 6,792,128 B1
DATED        : September 14, 2004
INVENTOR(S)  : Eric Nguyen It is certified that error appears in the above-identified patent and that said Letters Patent is hereby corrected as shown below:

Title page,
Item [56], References Cited, OTHER PUBLICATIONS, "A Secure Robust Digital Image Watermark by Joseph Ruanaidh et al., Proc. SPIE vol. 3409: Electronic Imaging: Processing, Printing and Publishing in Color, Sep. 1998.*" should read -- "A Secure Robust Digital Image Watermark," by Joseph Ruanaidh, et al., Proc. SPIE vol. 3409: Electronic Imaging: Processing, Printing and Publishing in Color, Sep. 1998.* --.
"Outils Geometriques pour la Modelisation et la Reconnaissance D'Objects Polyedriques, C. Puech, et al., PhD Thesis, INPG, pp 133-137, Jul. 1993." should read -- "Outils Geometriques pour la Modelisation et la Reconnaissance D' Objets Polyedriques," C. Puech, et al., PhD Thesis, INPG, pp. 133-137, Jul. 1993. --.

Column 2,
Line 20, "et al," should read -- et al., --.

Column 3,
Line 58, "make" should read -- making --.

Column 4,
Line 23, "ie" should read -- i.e., --.

Column 5,
Line 1, "There" should read -- There, --.

Column 6,
Line 43, "aspects" should read -- aspect --.

Column 10,
Line 9, "et al," should read -- et al., --.

Column 12,
Line 15, "component:" should read -- components: --.

UNITED STATES PATENT AND TRADEMARK OFFICE
CERTIFICATE OF CORRECTION

PATENT NO. : 6,792,128 B1
DATED : September 14, 2004
INVENTOR(S) : Eric Nguyen

It is certified that error appears in the above-identified patent and that said Letters Patent is hereby corrected as shown below:

Column 13,
Line 27, "origin Al" should read -- origin Al --.
Line 61, "(1.k)" should read -- (1,k) --.

Column 14,
Line 41, "etc)" should read -- etc.) --.

Column 15,
Line 28, "The" should read -- The -- (new paragraph).

Column 19,
Line 8, "sub-set" should read -- subset --.
Line 38, "quantities (α,p)" should read -- quantities (α,ρ) --.

Column 20,
Line 37, "rotation (O)," should read -- rotation (θ) --.

Column 22,
Line 15, "claims 34 or 35" should read -- claims 34 and 35 --.
Line 17, "means (100, 102, 103,)" should read -- means (100, 102 103) --.
Line 48, "claims 38 or 39" should read -- claims 38 and 39 --.
Line 53, "claims 38 to 39," should read -- claims 38 and 39, --.
Line 57, "or" should read -- and --.

Column 23,
Line 26, "one of claims 43 or 44" should read -- one of claims 43 and 44 --.

UNITED STATES PATENT AND TRADEMARK OFFICE
CERTIFICATE OF CORRECTION

PATENT NO. : 6,792,128 B1
DATED : September 14, 2004
INVENTOR(S) : Eric Nguyen

It is certified that error appears in the above-identified patent and that said Letters Patent is hereby corrected as shown below:

Column 24,
Lines 1 and 6, "one of claims 47 or 48" should read -- one of claims 47 and 48 --.
Lines 12, 19, 22, 26, 30, 33, 36, 39, 42, 45, 48, 51 and 54, "or" should read -- and --.
Line 50, "portions;" should read -- portions --.
Line 53, "implementing extrac-" should read -- implementing the extrac --.

Signed and Sealed this

Third Day of May, 2005

JON W. DUDAS
*Director of the United States Patent and Trademark Office*